United States Patent
Ereifej et al.

(10) Patent No.: US 8,150,273 B2
(45) Date of Patent: Apr. 3, 2012

(54) OPTICAL RECEIVER WITH THRESHOLD VOLTAGE COMPENSATION

(75) Inventors: Heider N. Ereifej, Quakertown, PA (US); Mark Colyar, New Hope, PA (US)

(73) Assignee: Finisar Corporation, Horsham, PA (US)

( * ) Notice: Subject to any disclaimer, the term of this patent is extended or adjusted under 35 U.S.C. 154(b) by 739 days.

(21) Appl. No.: 12/204,797

(22) Filed: Sep. 4, 2008

(65) Prior Publication Data

US 2010/0054758 A1    Mar. 4, 2010

(51) Int. Cl.
H04B 10/06  (2006.01)

(52) U.S. Cl. ...................................................... 398/202

(58) Field of Classification Search ................ 455/296, 455/150.01, 150; 398/30; 330/254
See application file for complete search history.

(56) References Cited

U.S. PATENT DOCUMENTS

| | | | |
|---|---|---|---|
| 6,760,552 B1 | 7/2004 | Tajima et al. | |
| 7,050,666 B2 * | 5/2006 | Welch et al. | 385/14 |
| 7,272,326 B2 * | 9/2007 | Fukuoka | 398/208 |
| 7,406,268 B2 * | 7/2008 | Schrodinger | 398/202 |
| 7,436,967 B2 * | 10/2008 | Neunaber | 381/55 |
| 7,620,332 B2 * | 11/2009 | Nishiyama | 398/202 |
| 2004/0075484 A1 | 4/2004 | Nishizono et al. | |
| 2004/0190913 A1 * | 9/2004 | Seo et al. | 398/202 |
| 2004/0190914 A1 | 9/2004 | Kang et al. | |

FOREIGN PATENT DOCUMENTS

JP    2000-201113 A    7/2000

OTHER PUBLICATIONS

"Notification of Transmittal of the International Search Report and the Written Opinion of the International Searching Authority, or the Declaration" for PCT/US09/055382, Mar. 17, 2010, 11 Pages, International Searching Authority/KR, Daejeon, Republic of Korea.

* cited by examiner

Primary Examiner — Jessica Stultz
Assistant Examiner — Tuan Nguyen
(74) Attorney, Agent, or Firm — Kurt Rauschenbach; Rauschenbach Patent Law Group, LLP

(57) ABSTRACT

An optical receiver includes an optical detector having an input that is positioned to detect an optical data signal. The optical detector generates a voltage at an output that is proportional to an optical intensity of the optical data signal. A differential amplifier includes a data input that is electrically connected to the output of the optical detector and a decision threshold voltage signal input. The differential amplifier generates a data signal at a data output and an inverse data signal at a data_bar output. A decision threshold voltage signal generator includes an output that is coupled to the decision threshold voltage signal input of the differential amplifier. The decision threshold voltage signal generator generates a decision threshold voltage signal having an amplitude that causes the differential amplifier to maintain a substantially constant differential voltage between the data signal and the inverse data signal generated.

20 Claims, 7 Drawing Sheets

OPTICAL RECEIVER WITH THRESHOLD VOLTAGE COMPENSATION

The section headings used herein are for organizational purposes only and should not to be construed as limiting the subject matter described in the present application.

BACKGROUND OF THE INVENTION

Most optical communication systems use optical fibers to propagate optical data signals because optical fibers have very low optical attenuation, wide bandwidths, and are secure. Demand for bandwidth is driving the expansion of optical transmission systems into homes and businesses of all size. Single wavelength fiber optic systems can support substantial data rates. However, services such as HDTV, on-demand TV programming, internet telephony, and telepresence can require a very high bandwidth.

Most current optical communication systems utilize digital transmissions of binary signals represented by 1-bits and 0-bits. Most state-of-the-art optical communications systems use multi-wavelength optical signals to achieve the desired bandwidth. Wavelength division multiplexing (WDM) is used to simultaneously transmit many high capacity optical signals over a single optical fiber. Each optical signal propagating in the WDM optical communications system occupies its own wavelength within the gain spectrum of the optical amplifiers that are used to offset the insertion loss of the optical cable and other optical network elements used to transmit the optical signal.

The increasing need for high bit-rate data transmissions through WDM optical communications system presents significant challenges to the fiber-optic telecommunications industry. One of these challenges is that optical communications systems experience a large power fluctuation when the optical path of one or more optical channel is switched to a different optical path. This is a fundamental limitation of the optical amplifiers used in the system. These amplifiers use optical power monitors to feedback signals to the amplifier control circuit that, in turn, adjusts the output power in order to maintain a constant gain for each of the WDM signals that are transmitted. The time that it takes the optical amplifier to re-adjust the power is a significant time, typically on the order of one mill-second. During this time, a significant degradation in the performance of the optical link is expected.

BRIEF DESCRIPTION OF THE DRAWINGS

The aspects of this invention may be better understood by referring to the following description in conjunction with the accompanying drawings. Identical or similar elements in these figures may be designated by the same reference numerals. Detailed descriptions about these similar elements may not be repeated. The drawings are not necessarily to scale. The skilled artisan will understand that the drawings, described below, are for illustration purposes only. The drawings are not intended to limit the scope of the present teachings in any way.

DETAILED DESCRIPTION

Figure 1:
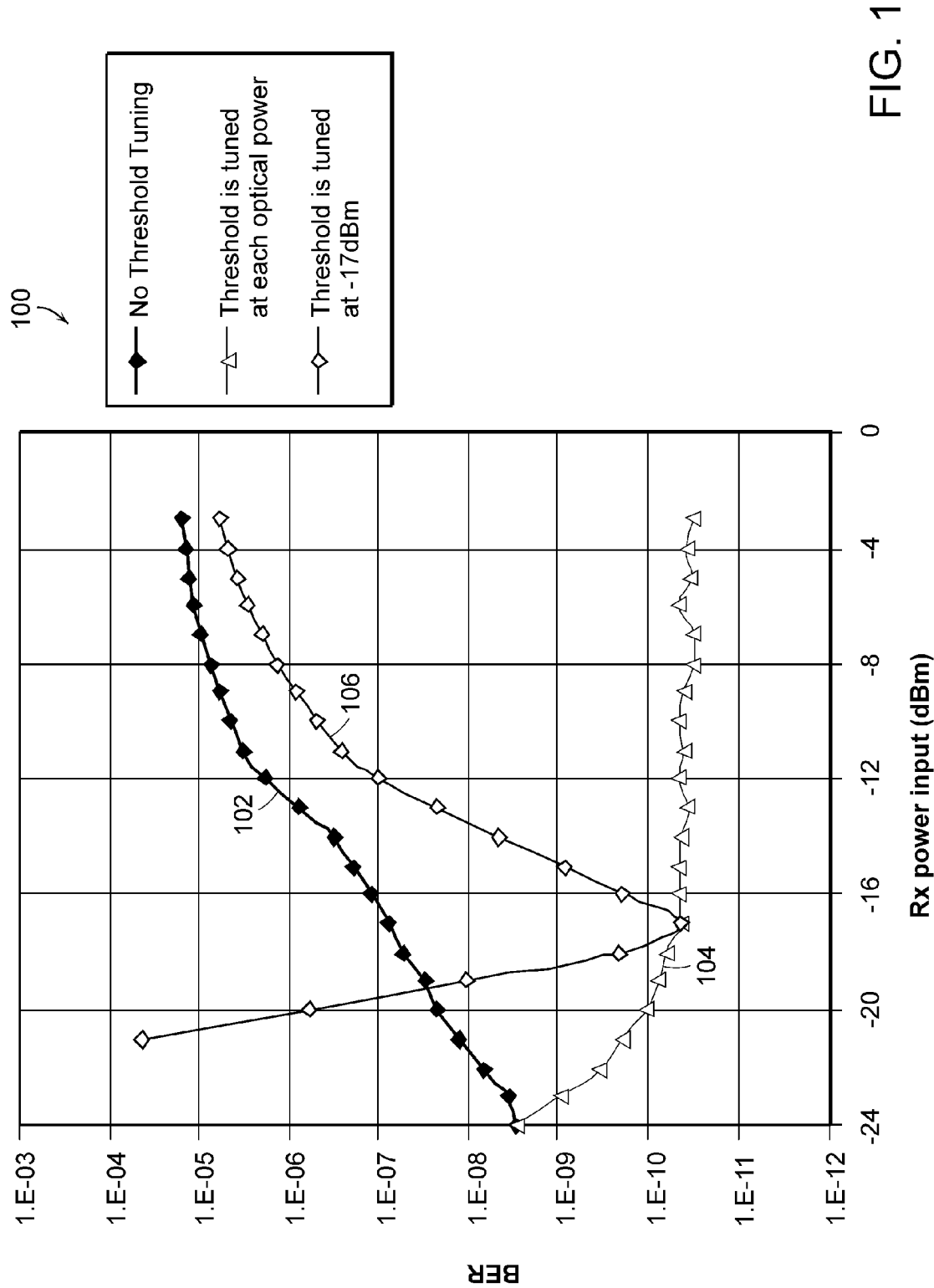
FIG. 1 illustrates measured bit error rate data as a function of received optical power in dBm for three different receiver decision threshold conditions.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

It should be understood that the individual steps of the methods of the present invention may be performed in any order and/or simultaneously as long as the invention remains operable. Furthermore, it should be understood that the apparatus and methods of the present invention can include any number or all of the described embodiments as long as the invention remains operable.

The present teachings will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teachings herein will recognize additional implementations, modifications, and embodiments, as well as other fields of use, which are within the scope of the present disclosure as described herein. For example, it should be understood that the methods and apparatus of the present invention are not limited to a particular data format or a particular data rate. In fact, the methods and apparatus of the present invention can be used with any type of data format and any data rate.

Optical amplifiers used in state-of-the-art optical communication systems utilize feedback circuits to monitor either the input or the output power to the amplifier. The amplifier circuit uses a series of algorithms to adjust the operating conditions of the optical amplifier to maintain a constant power per channel at the output. Once a channel is dropped, the amplifier senses this change and adjusts its operating parameters to preserve the output power per channel. The time that this process takes varies considerably depending on the particular optical amplifier. However, almost all amplifier outputs (for at least brief time) will experience an optical transient, which in some cases, can be as high as 10 dB relative to the steady state power per channel.

Almost all state-of-the-art optical communication systems use optical amplifiers to offset the optical link insertion loss. When some or all of the channels in a multi-channel optical signal propagating in the optical link are switched from one optical signal path to another optical signal path, the power in either of the optical signal paths will experience large power fluctuations. During these switching events the un-switched optical links should run with as little interruption as possible. In some state-of-the-art optical links, this effect is mitigated by adding an additional fast variable optical attenuator that maintains the power in the link constant. The additional variable optical attenuator can be bulky and very costly to both install and maintain. However, in most cases, the additional variable optical attenuator does not eliminate the power transient in a fast enough time.

Automatic Gain Control (AGC) amplifiers in the receiver can also be used to mitigate the effect of power transients. Automatic gain control amplifiers use the optical power monitor in the receiver to generate a feedback signal that is coupled to a control circuit which adjusts the electrical gain of the RF amplifier. However, using the average optical power as a feedback signal does not provide an accurate and predictable signal to control the AGC amplifier. Ultimately, the optical link performance will depend on the tolerance of the receiver to these power fluctuations.

Most optical links employ external feedback mechanisms to overcome these fluctuations. However, such external feedback mechanisms are relatively slow and cannot handle large dynamic power changes. Furthermore, most optical fiber amplifiers, such as EDFAs, require significant time to adjust their gain in order to maintain the required power per channel. During this time, significant degradation in the system BER can be expected.

The optical link performance is measured using bit error rate counters that distinguish 1-bits from 0-bits of the incoming data after the data is received. Most receivers consist of an Optical-to-Electrical (OE) signal convertor followed by a signal digitizer that converts the incoming optical signal into a stream of digitized electrical 1 bits and 0 bits. If errors occur in determining whether the incoming optical signal is a 1-bit or a 0-bit, the optical communication link encounters a bit error rate error. The number of errors that are encountered in the optical communication link is strongly dependent on the process of digitizing the incoming optical signal.

The BER in most optical links depends strongly on the receiver decision threshold. The receiver threshold ultimately defines the level above which the received data is considered a binary "1" bit and below which the received data is considered a binary "0". The position of this threshold strongly depends on the optical power at the receiver. Experiments have been performed to determine the dependence of BER on the received optical power and the optimum decision threshold as a function of the received optical power.

FIG. 1 illustrates measured bit error rate data 100 as a function of received optical power in dBm for three different receiver decision threshold conditions. The optical signal used in this test was a Non-Return-to-Zero (NRZ) format signal with optical noise loading. FIG. 1 presents a first graph 102 showing data for bit error rate when the decision threshold is fixed at a static set point, which is how most common optical receivers operate. The data presented in the first graph 102 indicate a gradual increase in bit error rate as the received optical power is increased.

FIG. 1 also presents a second graph 104 showing data for bit error rate when the decision threshold is optimized for each received optical power. The data indicate an improvement in bit error rate performance that corresponds to about 3 db in total system performance when the decision threshold is optimized for each received optical power.

In addition, FIG. 1 presents a third graph 106 showing data for bit error rate when the decision threshold is tuned at −17 dBm. The data indicates that performance at about −17 dBm is optimum. However, the data also indicate that at other power levels, the bit error rate increases by several orders of magnitude. For example, if the optical power is then suddenly changed from −17 dBm to −22 dBm, the bit error rate increases by almost six orders of magnitude to a level that will result in a synchronization loss event. Such changes in the received optical power commonly occur during optical switching. Thus, the data in the graphs 102, 104, and 106 indicate that the decision threshold needs to be constantly changed in order to optimize performance when there are fluctuations in the received optical power. It is known that different receivers behave differently under similar conditions. In known systems, the decision threshold requires optimization to achieve the best BER.

The process of digitizing the optical signal has several factors that influence the accuracy of the process. One of these factors is the decision level that these digitizers use to determine whether the incoming signal is a 1-bit or a 0-bit. Another important factor is the shape and stability of the incoming signal to the receiver. Variation in optical input power to the receiver will change the signal shape that the electrical digitizer processes. Attempting to make the electrical signal constant regardless of the input power to the optical receiver has been shown to be a difficult task. A closed loop feedback system with a very fast response time (about 10 μsec) is necessary to maintain the shape of the signal applied to the digitizer under sudden and unpredictable power changes.

Most optical receivers have a control pin that is designed to receive a control voltage that is chosen to change the signal shape generated at the output. Using a control voltage to achieve threshold optimization has been shown to provide improved BER performance. However, using such a control voltage requires accurate feedback. Using an optical power feedback system is not practical for most system because most receiver power monitors used in optical communication links only report the average DC power. In order to achieve an accurate and meaningful close loop control mechanism, information about the shape of the incoming signal needs to be monitored.

Figure 2:
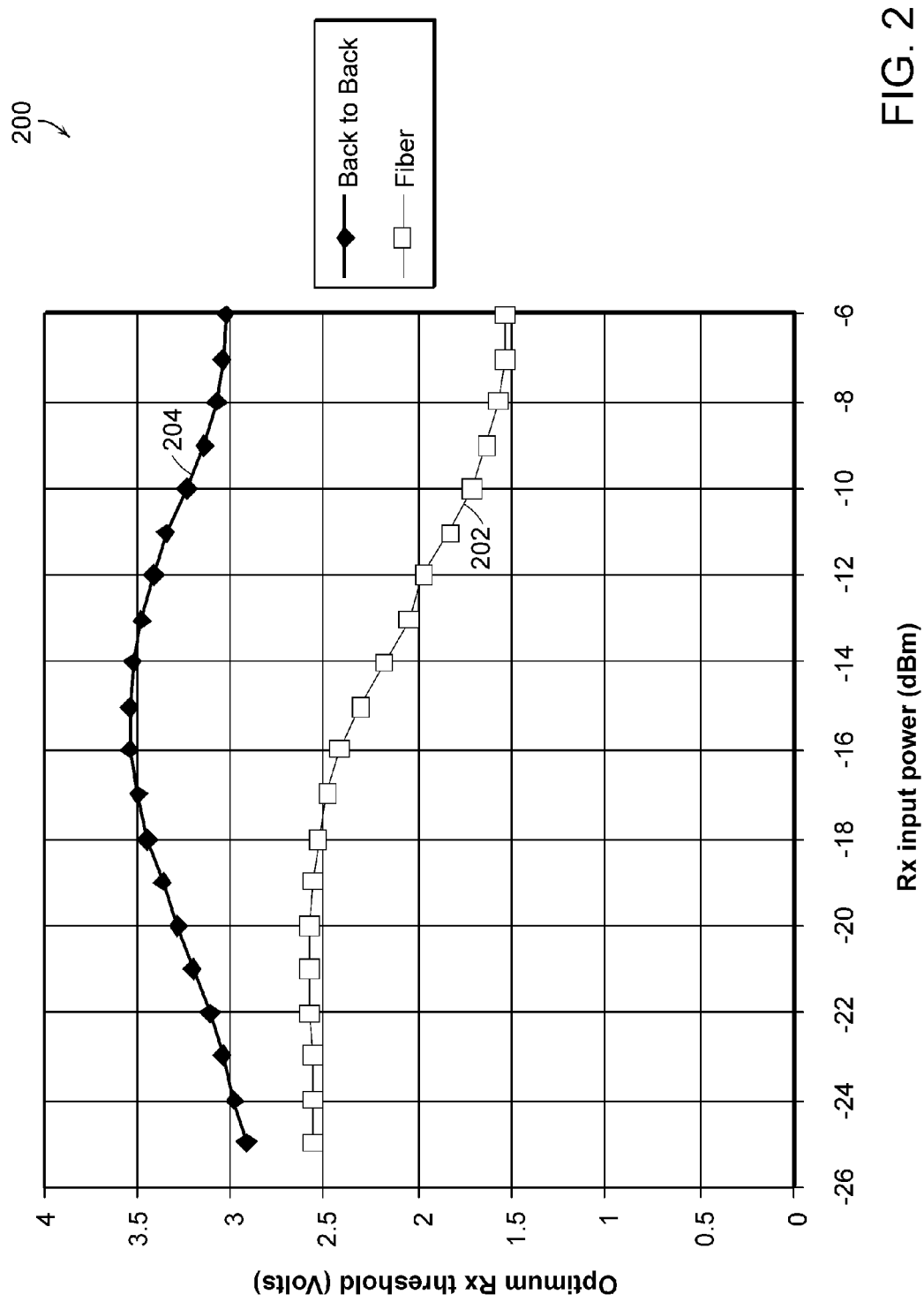
FIG. 2 illustrates data for optimum receiver decision threshold in volts as a function of received input power in dBm.

FIG. 2 illustrates data 200 for optimum receiver decision threshold in volts as a function of received input power in dBm. FIG. 2 presents a first graph 202 showing data for the optimum decision threshold in volts as a function of the received input power in dBm for an optical communications system that includes an optical fiber link with a 50 km length. The data in the first graph 202 indicate that the optimum decision threshold can strongly depend on the received input power. FIG. 2 also presents a second graph 204 showing data for optimum decision threshold in volts as a function of received input power in dBm for an optical communications system with an optical receiver positioned back-to-back with the optical transmitter with no fiber optic link between the optical transmitter and the optical receiver. The data in the second graph 204 also indicate that the optimum decision threshold can strongly depend on the received input power.

Comparing the data in the first graph 202 with the data in the second graph 204 indicates that the optimum decision threshold is significantly different for different system conditions. In particular, the data in the first graph 202 indicates that the optimum decision threshold is strongly dependent on the dispersion in the optical fiber link. The strong dependence of the dispersion is caused by the distortion of the optical signal as it propagates through the optical link. This variation in the receiver threshold requires a simple and accurate feedback mechanism that can be utilized to adjust the threshold for each system condition as a function of optical power.

The data in FIG. 2 show that the optimum decision threshold is a complex function of both the received optical power and the system conditions. A static open-loop compensation system that uses optical power cannot be used to maintain an optimum decision threshold for different system conditions.

Figure 3:
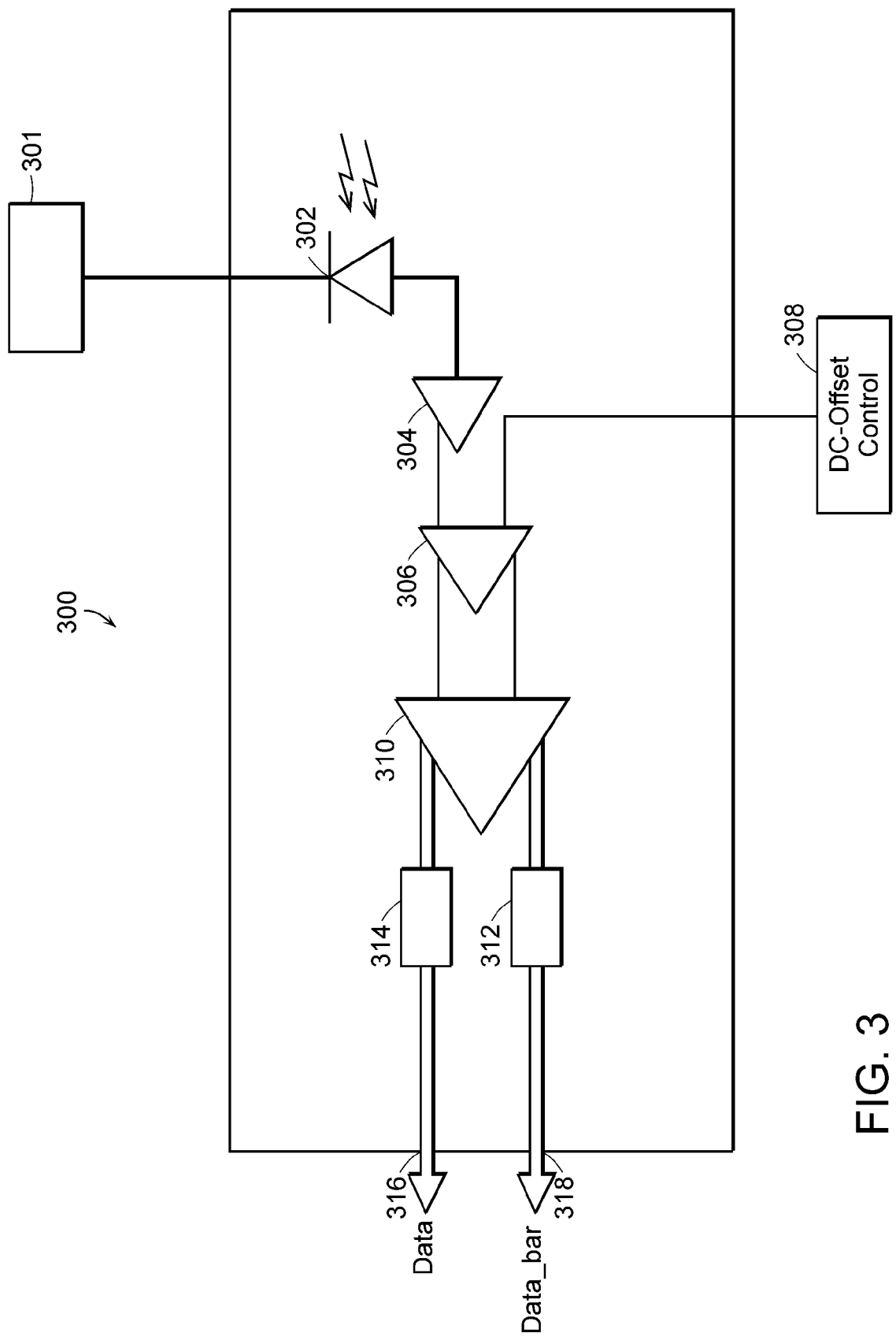
FIG. 3 illustrates an optical receiver according to the present invention.

FIG. 3 illustrates a typical optical receiver 300 layout. The optical receiver 300 includes a photodetector 302 having an optical input that is coupled to the output of the fiber optical link that transmits data from an optical transmitter. A voltage power supply biases the photodetector 302 at the desired operating point. For example, the photodetector 302 can be a PIN diode photodetector or an Avalanche-Photo-Detector (APD), which are both well known in the art. The photodetector 302 generates an electrical current signal in response to an optical signal received from the fiber optic link.

The output of the photodetector 302 is electrically connected to an input of a trans-impedance amplifier 304. The trans-impedance amplifier 304 converts the electrical current signal generated by the photodetector 302 to a voltage data signal. In many embodiments, the transfer function of the trans-impedance amplifier 304 is relatively linear over the entire operating optical power range of the receiver 302.

The output of the transimpedence amplifier 304 is electrically coupled to a differential RF amplifier 306. The differential RF amplifier 306 generates a differential output representing the original data and the inverse data (data_bar). In most common differential amplifiers 306, the output data and data_bar crossing can be adjusted by utilizing a DC-offset 308 to one of the arms of the RF amplifier 306. In most common applications, at least one additional differential amplifier 310 is used in order to generate higher output levels.

In some embodiments, the data output and the data_bar output of the differential amplifier 306 are electrically connected to respective ones of an electrical data filter 312 and an electrical data_bar filter 314 that process the second amplified difference signal and the inverse of the second amplified difference signal. In alternative embodiments, the data output and the data_bar output of the last differential amplifier are electrically connected to respective ones of the electrical data filter 312 and the electrical data_bar filter 314. For example, Bessel-Thomson filters can be used to improve the electrical return loss and/or the differential group delay of the receiver. The output of the data filter 312 is electrically connected to the data output 316 of the receiver 300. The output of the data_bar filter 314 is electrically connected to the data_bar output 318 of the receiver 300.

In operation, the photodetector 302 generates an electrical current signal in response to an optical signal received from the fiber optic link. The trans-impedance amplifier 304 converts the electrical current signal generated by the photodetector 302 to a voltage data signal. The output from the trans-impedance amplifier 304 is then amplified using the differential amplifier 306. The output from this differential amplifier 306 is then fed to the digitizing circuit. The DC-offset control 308 is used to change the differential amplifier output crossing to optimize the operation of the digitizing circuit which results in optimizing the BER of the optical system.

As shown in FIG. 2, the optimized TIA DC-offset changes dramatically as a function of input optical power to the optical receiver 300. Furthermore, FIG. 1 shows that the performance of the optical link is significantly improved with the optimization of the TIA DC-offset as a function of optical power. One aspect of the present invention is the realization that maintaining the differential voltage across the output of the RF amplifier 306 at a constant level will result in a substantially constant link BER regardless of the change in the optical input power. Thus, using the methods and apparatus of the present invention, the BER can be maintained at an optimized performance point. In other words, by maintaining the RF amplifier 306 output crossing constant, the optical link BER performance remains at an optimized point. Thus, in one embodiment, an optical receiver according to the present invention includes an automatic threshold compensation system that can maintain an optimum decision threshold by maintaining the differential voltage across the output of the optical receiver at a substantially constant value.

Figure 4:
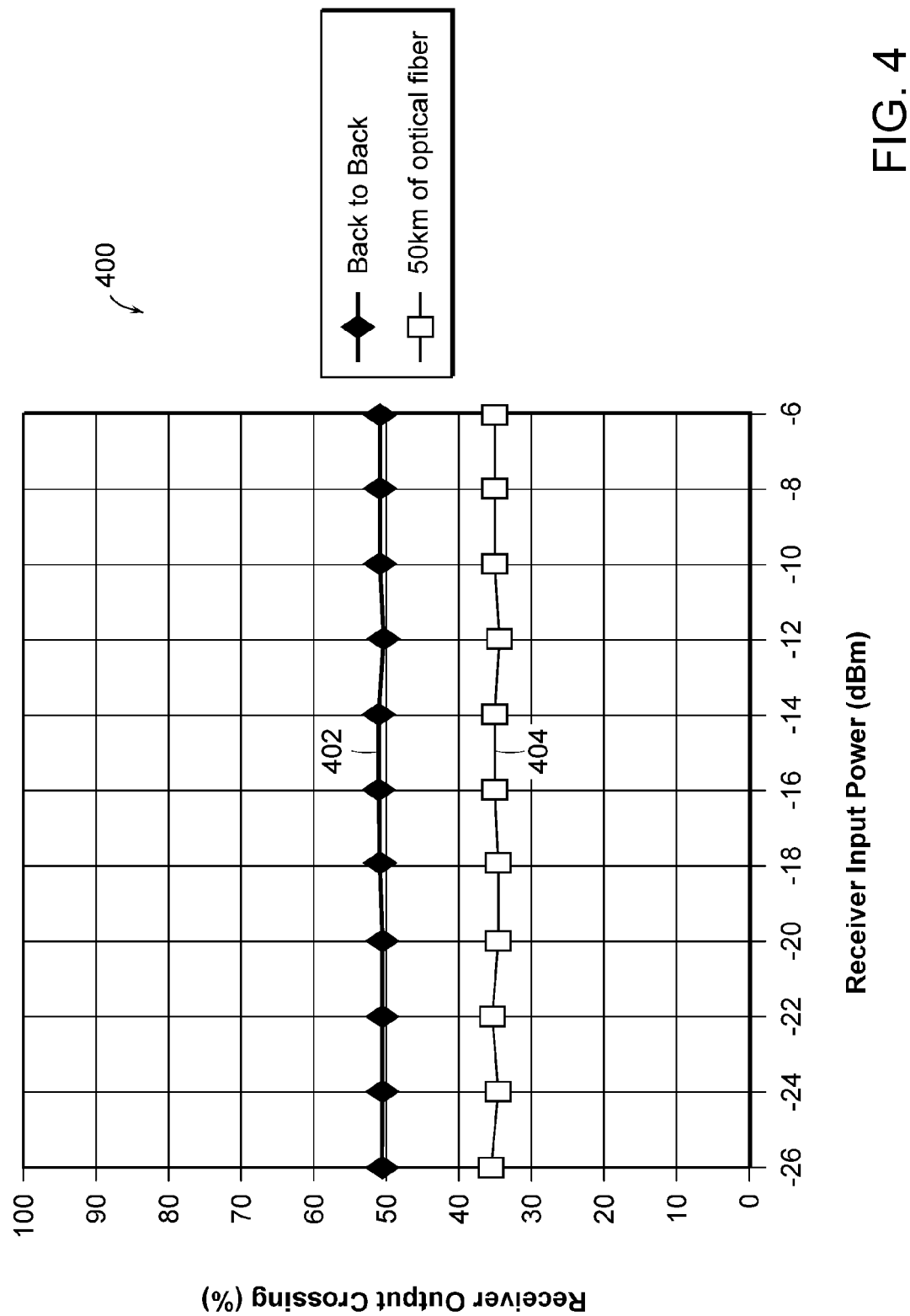
FIG. 4 illustrates the receiver output crossing according to the present invention as a function of the receiver input power in dBm when the DC-offset voltage is adjusted to generate the optimum BER of the receiver.

FIG. 4 illustrates the receiver output crossing 400 according to the present invention as a function of the receiver input power in dBm when the DC-offset voltage is adjusted to generate the optimum BER of the receiver. The first graph 402 illustrates the receiver output crossing 400 of an optical receiver according to the present invention that is positioned back-to-back with the optical transmitter with no fiber optic link between the optical transmitter and the optical receiver. The second graph 404 illustrates the receiver output crossing of an optical receiver according to the present invention in an optical communications system that includes an optical fiber link with a 50 km length. The data in graphs 402 and 404 show that in the optical receiver according to the present invention, the crossing of the output is constant for both the optical communications system with the optical receiver positioned back-to-back with the optical transmitter and for an optical communications system that includes an optical fiber link with a 50 km length. Thus, by using the optical receiver according to the present invention, the receiver output crossing can be maintained at a substantially constant value, which can maintain the optimized threshold for a predetermined or for a minimum BER. Holding the receiver output crossing constant is equivalent to maintaining the differential voltage across the data and data_bar output at a constant value.

Figure 5:
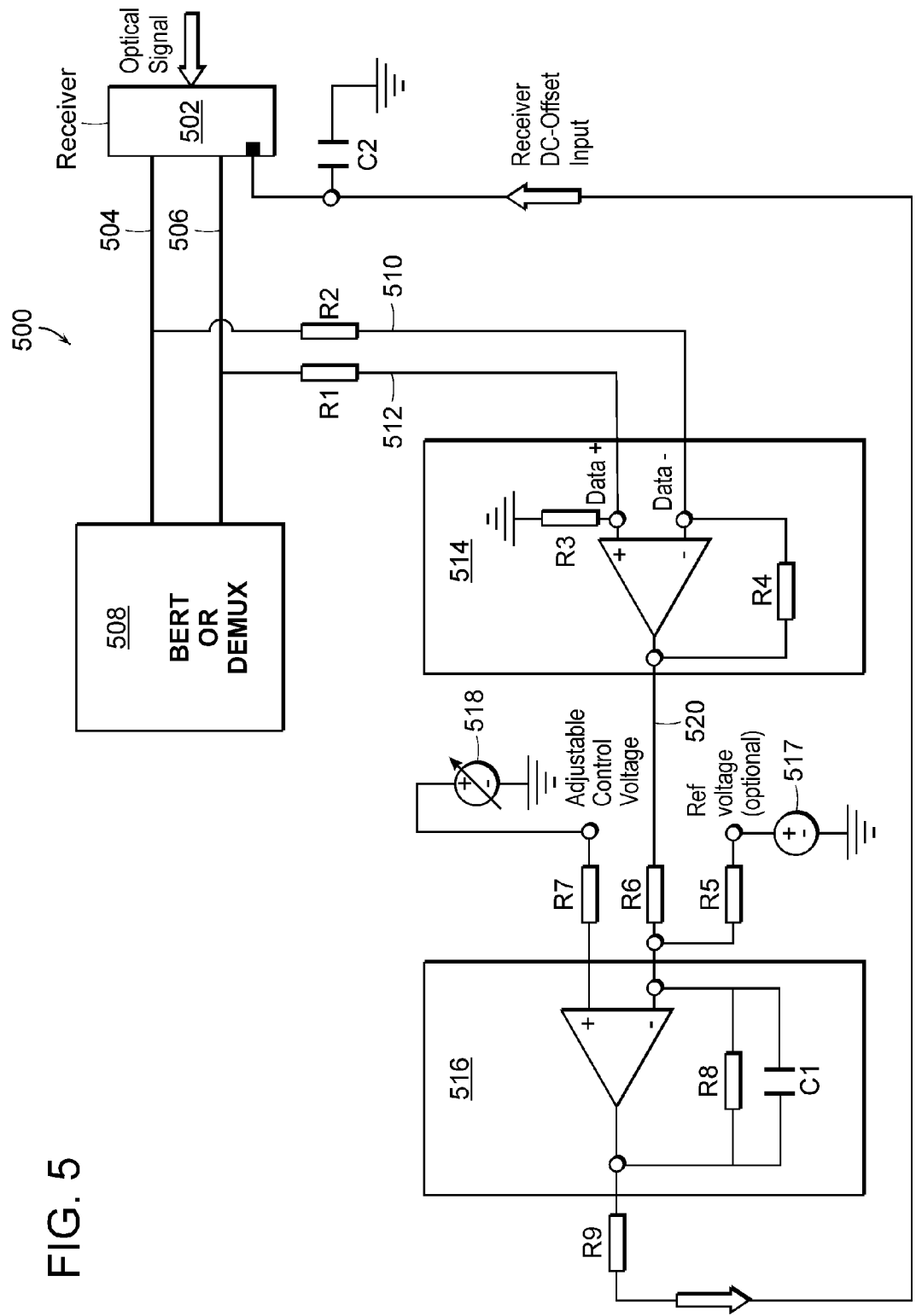
FIG. 5 illustrates a closed loop threshold offset control circuit for an optical receiver with an automatic threshold compensation system according to the present invention.

FIG. 5 illustrates a closed loop threshold offset control circuit 500 for an optical receiver 502 with an automatic threshold compensation system according to the present invention. In one embodiment, the receiver 502 is the receiver 300 that was described in connection with FIG. 3 or the equivalent, which includes a data output 504 and a data_bar output 506. The data output 504 and the data_bar output 506 are coupled to inputs of an electronic digitizer (BERT or Demux etc) 508. In addition, the data output 504 is coupled to a data transmission line 510 and the data_bar output 506 is coupled to a data_bar transmission line 512.

The data transmission line 510 is coupled to a first input of a differential amplifier 514. The data_bar transmission line 512 is coupled to a second input of the differential amplifier 514. The output of the differential amplifier 514 is electrically connected to a first input 520 of an integrator 516. An adjustable control voltage source 518 is electrically connected to a second input of the integrator 516. An optional reference voltage 517 is also electrically connected to the first input of the integrator 516.

In operation, the differential amplifier 514 generates a difference signal at an output that is the amplified difference in the voltage on the data transmission line 510 and the voltage on the data_bar transmission line 512. The differential amplifier 514 generates a voltage that is applied to the input 520 of the integrator 516 such that the two electrical inputs to the integrator 516 have equal voltages. The voltage that the output of integrator 516 locks onto can be varied by the adjustable control voltage 518. This adjustable control voltage is typically adjusted once to provide the optimum BER performance of the optical link. Resistors R1 through R9 and capacitors C1 and C2 can be chosen to optimize the ideal gain and integration time of the close loop circuit respectively.

Figure 6A:
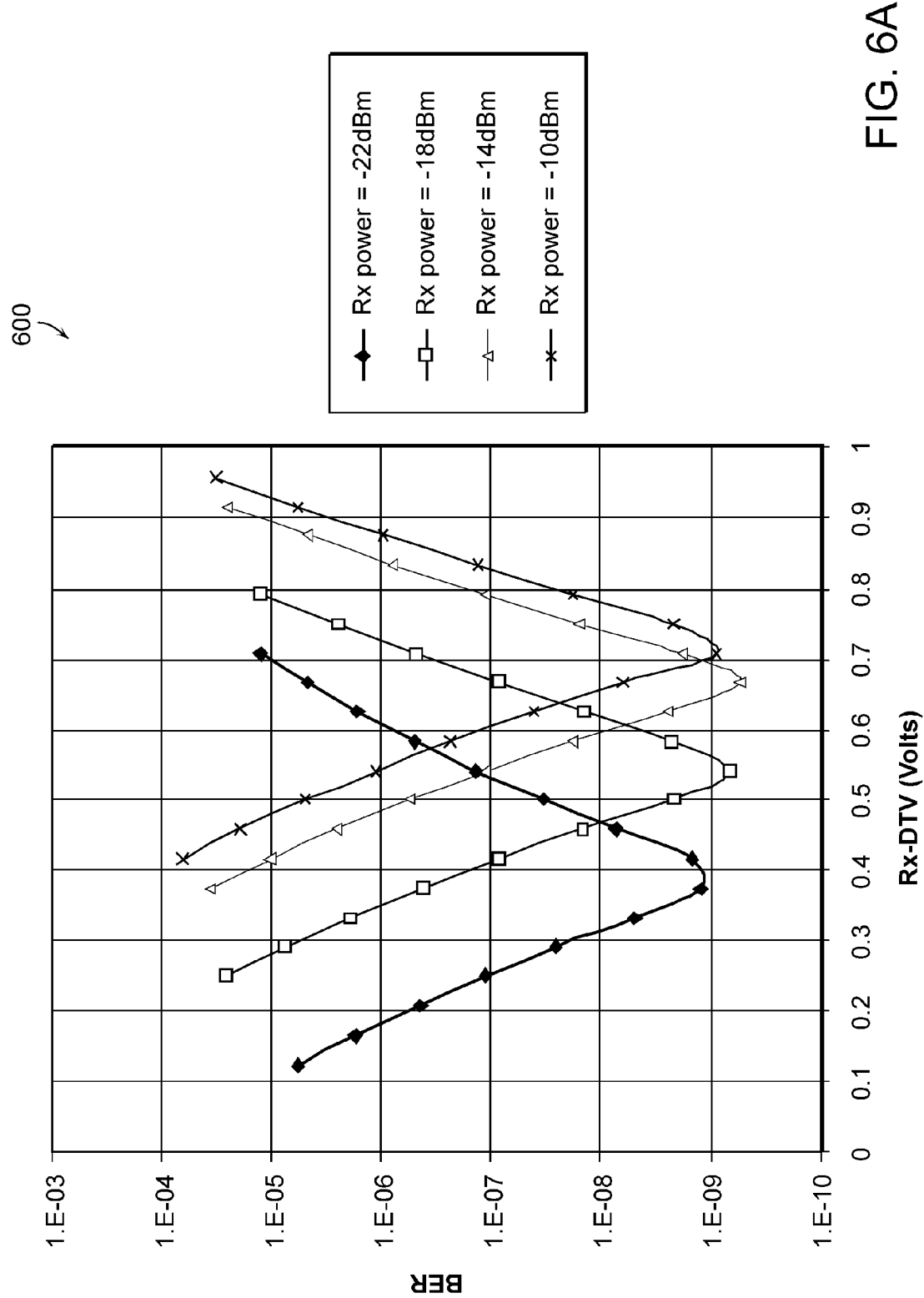
FIG. 6A illustrates data plots of bit error rate as a function of receiver DC-Offset voltage for an optical receiver without the automatic threshold voltage compensation of the present invention.

FIG. 6A illustrates data plots 600 of bit error rate as a function of receiver DC-offset voltage for an optical receiver without the automatic threshold voltage compensation of the present invention. The data transmitted was NRZ data signals at 10.709 Gbps. Bit error rate data is presented for a receiver directly connected back-to-back with the transmitter (B-B or back-to-back data). The optical signal-to-noise ratio for the back-to-back transmission system was 16 dB/0.1 nm.

Data is presented for received optical power levels equal to −10 dBm, −14 dBm, −18 dBm, and −22 dBm. The data plots 600 of bit error rate as a function of receiver DC-offset voltage indicate that the optimum BER is strongly dependent on receiver input optical power.

Figure 6B:
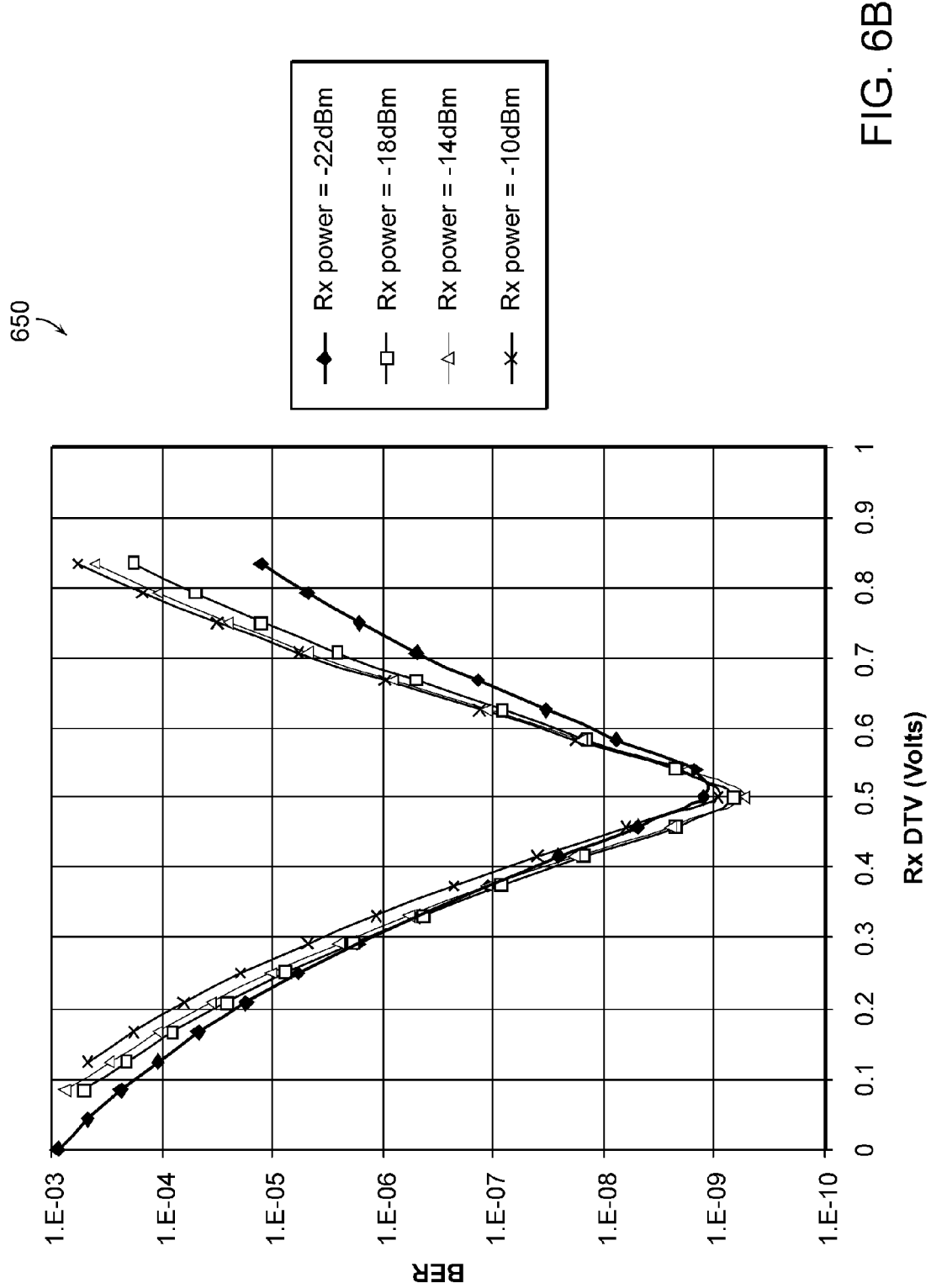
FIG. 6B illustrates data plots of bit error rate as a function of receiver DC-Offset voltage for an optical receiver with the automatic threshold voltage compensation of the present invention.

FIG. 6B illustrates data plots 650 of bit error rate as a function of receiver DC-offset voltage for an optical receiver with the automatic threshold voltage compensation of the present invention. The data and transmission conditions were chosen to be similar to the data and transmission conditions used to obtain the data plots 600 for the optical receiver without the automatic threshold voltage compensation of the present invention that was described in connection with FIG. 6A. The data transmitted was NRZ data signals at 10.709 Gbps. Bit error rate data is presented for a receiver directly connected back-to-back with the transmitter (B-B or back-to-back data). The optical signal-to-noise ratio for the back-to-back data was 16 dB/0.1 nm. Bit error rate data is presented for received optical power levels equal to −10 dBm, −14 dBm, −18 dBm and −22 dBm. The data plots 650 of bit error rate as a function of receiver DC-offset voltage indicate that the receiver threshold voltage which provides the lowest bit error rate is essentially independent of the optical power level at the receiver.

EQUIVALENTS

While the present teachings are described in conjunction with various embodiments and examples, it is not intended that the present teachings be limited to such embodiments. On the contrary, the present teachings encompass various alternatives, modifications and equivalents, as will be appreciated by those of skill in the art, which may be made therein without departing from the spirit and scope of the invention.

What is claimed is:

1. An optical receiver comprising:
   a. an optical detector having an input that is positioned to detect an optical data signal, the optical detector generating a voltage at an output that is proportional to an optical intensity of the optical data signal;
   b. a differential amplifier having a data input that is electrically connected to the output of the optical detector and a decision threshold voltage signal input, the differential amplifier generating a data signal at a data output and an inverse data signal at a data_bar output; and
   c. a decision threshold voltage signal generator having an output that is coupled to the decision threshold voltage signal input of the differential amplifier, the decision threshold voltage signal generator measuring a difference between the data signal and the inverse data signal and generating a decision threshold voltage signal from the measurement having an amplitude that causes the differential amplifier to maintain a substantially constant differential voltage between the data signal and the inverse data signal generated by the differential amplifier that is independent of an amplitude of the data signal, thereby reducing a bit error rate during fluctuations in the intensity of the optical data signal.

2. The optical receiver of claim 1 wherein the optical detector comprises a photodetector that generates a photocurrent in response to the optical data signal and a transimpedance amplifier that generates the voltage that is proportional to the optical intensity of the optical data signal from the photocurrent.

3. The optical receiver of claim 2 wherein the photodetector comprises a PIN photodiode.

4. The optical receiver of claim 2 wherein the photodetector comprises an Avalanche Photo-Diode (APD).

5. The optical receiver of claim 2 wherein the transimpedance amplifier comprises a substantially linear transimpedance amplifier that generates a voltage that is linearly proportional to the optical intensity of the optical data signal.

6. The optical receiver of claim 1 further comprising a second differential amplifier having a first input that is electrically connected to the data output of the differential amplifier and second input that is electrically connected to the data_bar output of the differential amplifier, the second differential amplifier generating an amplified data signal with a predetermined gain at a data output and generating an amplified inverse data signal with a predetermined gain at a data_bar output.

7. The optical receiver of claim 1 further comprising a first electrical filter electrically connected to the data output of the differential amplifier and a second electrical filter electrically connected to the data_bar output of the differential amplifier.

8. The optical receiver of claim 7 wherein at least one of the first and the second electrical filters comprises a Bessel-Thomson filter.

9. The optical receiver of claim 1 wherein the decision threshold voltage signal generator comprises an integrator that integrates the differential voltage between the data signal and the inverse data signal to generate the decision threshold voltage signal.

10. A method of receiving an optical data signal, the method comprising:
    a. generating a voltage detection signal proportional to an intensity of the optical data signal;
    b. generating a decision threshold voltage signal by measuring a difference between the optical data signal and an inverse of the optical data signal; and
    c. generating a data signal and an inverse data signal that are proportional to a difference between the voltage detection signal and the decision threshold voltage signal, wherein the decision threshold voltage signal is chosen to maintain a substantially constant differential voltage between the data signal and the inverse data signal independent of an amplitude of the data signal, thereby reducing bit error rate during fluctuations in the intensity of the optical data signal.

11. The method of claim 10 wherein the voltage detection signal is linearly proportional to the intensity of the optical data signal.

12. The method of claim 10 wherein the generating the voltage proportional to the intensity of the optical data signal comprises detecting the optical data signal with a photodetector and converting a photocurrent generated by the photodetector into a voltage with a transimpedance amplifier.

13. The method of claim 10 wherein the generating the voltage proportional to the intensity of the optical data signal comprises generating a voltage that is linearly related to the intensity of the optical data signal.

14. The method of claim 10 further comprising integrating the differential voltage between the data signal and the inverse data signal to generate the decision threshold voltage signal.

15. The method of claim 10 further comprising filtering at least one of the data signal and the inverse data signal to improve at least one of an electrical return loss and a differential group delay.

16. An optical receiver comprising:
  a. a means for generating a voltage detection signal proportional to an intensity of a received optical data signal;
  b. a means for generating a data signal and an inverse data signal that are proportional to a difference between the voltage detection signal and a decision threshold voltage signal,
  c. a means for measuring a difference between the data signal and the inverse data signal; and
  d. a means for adjusting the decision threshold voltage signal from the measurement of the difference between the data signal and the inverse data signal to maintain a substantially constant differential voltage between the data signal and the inverse data signal independent of an amplitude of the data signal.

17. The optical receiver of claim 16 wherein the voltage detection signal is linearly proportional to the intensity of the optical data signal.

18. The optical receiver of claim 16 further comprising a means for generating the decision threshold voltage signal.

19. The optical receiver of claim 18 wherein the means for generating the decision threshold voltage signal integrates the differential voltage between the data signal and the inverse data signal.

20. The optical receiver of claim 16 further comprising a means for filtering at least one of the data signal and the inverse data signal.

* * * * *